United States Patent Office

2,948,697
Patented Aug. 9, 1960

2,948,697

PLASTICIZED POLYVINYL ALCOHOL COMPOSITION

James A. Robertson, Lewiston, N.Y., assignor to E. I. du Pont de Nemours and Company, Wilmington, Del., a corporation of Delaware No Drawing. Filed Apr. 23, 1958, Ser. No. 730,255

6 Claims. (Cl. 260—29.2)

This invention relates to polyvinyl alcohol compositions and in particular to polyvinyl alcohol containing an improved plasticizer composition.

Materials commonly used as plasticizers for polyvinyl alcohol include organic compounds such as glycerol, polyglycerol, ethylene glycol, some of the lower polyethylene glycols, ethanol acetamide, ethanol formamide, and ethanolamine salts such as the acetate of triethanolamine. Polyvinyl alcohol films plasticized with these humectant-type materials, however, are known to absorb moisture when exposed to high humidity conditions. This results in the films becoming tacky and weak. Furthermore, under relatively anhydrous conditions, polyvinyl alcohol films containing these materials are brittle and shock-sensitive at low temperatures. This behavior suggests that the humectant-type plasticizers attract water which in turn acts as the primary plasticizer in the polyvinyl alcohol composition.

A plasticizer for polyvinyl alcohol is required which will permit plasticized films to remain strong and non-tacky at high humidities, yet retain their toughness and shock resistance at low humidities and temperature. These properties are important to the use of polyvinyl alcohol in applications such as water-soluble packages for detergents, bleaching agents, dyes, insecticides, etc., water-soluble backing material in lace manufacture, polarized film for glasses, and other applications where the polyvinyl alcohol composition may be subjected to the extremes of temperature and humidity encountered under various atmospheric conditions.

It is an object of this invention to provide a plasticized polyvinyl alcohol composition which remains non-tacky and strong during exposure to 100% relative humidity. Another object is a plasticized polyvinyl alcohol composition of low water content which is tough and shock-resistant at low temperature. Another object is a plasticized polyvinyl alcohol film which is suitable for use in cold-water-soluble packages. A further object is a plasticized polyvinyl alcohol film which is resistant to changes in color and solubility characteristics on exposure to elevated temperatures. A still further object is an aqueous polyvinyl alcohol composition which yields films which are strong, non-tacky and shock-resistant under various atmospheric conditions.

These and other objects are attained in accordance with this invention by the use of a plasticizer composition for polyvinyl alcohol consisting of (1) a polypropylene glycol containing a predominant amount of tetrapropylene glycol and (2) a mixture of ethoxylated butyl acid phosphates. The combination plasticizer is effective for partially hydrolyzed grades of polyvinyl alcohol, that is, those grades prepared by replacement of from about 85 to about 95% of the acetate groups of polyvinyl acetate by hydroxyl groups.

The mixture of ethoxylated butyl acid phosphates suitable for use in this invention is represented by the formula $(C_4H_9O)_aPO[O(CH_2CH_2O)_bH]_{3-a}$, where $a$ is 1 or 2 and $b$ is an integer from 1 to 4. This mixed phosphate ester may be prepared by reaction of the required amount of ethylene oxide with mono- or dibutyl acid phosphate or mixtures thereof. V–C 1–318–19, a mixture of ethoxylated butyl acid phosphates marketed by the Virginia-Carolina Chemical Corporation, is an example of a satisfactory mixed phosphate ester for my plasticizer composition.

The polypropylene glycol suitable for use in my invention contains a predominant amount of tetrapropylene glycol which is represented by the formula $$HO(C_3H_6O)_4H$$

This material may be prepared by reaction of 1,2-propylene oxide with water or 1,2-propylene glycol. The 1,2-propylene glycol, which is the first intermediate obtained from the reaction of propylene oxide and water, can react with propylene oxide at either the primary or secondary hydroxyl group to give a dipropylene glycol. Reaction with two additional propylene oxide molecules gives the desired tetrapropylene glycol, which has a molecular weight of 250. Small quantities of lower and higher molecular weight materials can be present provided the polypropylene glycol contains at least 90% by weight of the tetrapropylene glycol. I have found that appreciable quantities of the lower molecular weight materials, especially dipropylene glycol, gives films which are unsatisfactory at high humidity and that materials with molecular weights of about 400 and above are not completely compatible with polyvinyl alcohol. Polypropylene glycol P–250, which is marketed by the Dow Chemical Company, is an example of a material which is suitable for use as an ingredient of my plasticizer composition.

The polyvinyl alcohol alcohol used in my invention must be a partially hydrolyzed grade since the plasticizer combination is not as effective for the completely hydrolyzed grades, that is, the grades made by replacement of 99–100% of the acetate groups of polyvinyl acetate by hydroxyl groups. Moreover, for the films to be suitable for water-soluble package use, it is desirable that the polyvinyl alcohol be soluble in both cold and hot water. The 85–95% hydrolyzed grades of polyvinyl alcohol meet this requirement while completely hydrolyzed grades, in particular those grades which give 4% aqueous solutions with viscosities above about 15 centipoises at 20° C., do not dissolve completely in cold water.

The invention is illustrated by the following examples, which, however, are presented merely as specific embodiments of my invention and are not to be considered limitative. In the examples, all parts are parts by weight, unless otherwise indicated.

PROCEDURE

The plasticizers and plasticizer combinations shown in the examples were incorporated into the polyvinyl alcohol by adding them to aqueous polyvinyl alcohol solutions and agitating until homogeneous solutions were obtained. The aqueous solutions were then cast as films on polished plate glass by means of doctor-blades set at the clearance required to give dried films of 2 mils thickness. After the films had dried, either at room temperature or in an oven at 90° C., they were stripped from the glass plates and then conditioned at 73° F. and 50% relative humidity (R.H.) for 24 hours.

Packages were made from the conditioned films by heat-sealing two 2" x 2" samples along 1/8" strips at three of the edges. The heat-sealing was effected by moistening the edges of the films, then applying a pressure of 26 lbs./sq. in. at a temperature of 150° C. for 2 seconds. The packages were charged with 15 grams of sand and then heat-sealed as before along the fourth edge.

The packages containing sand were used for testing low temperature toughness by conditioning for 4 hours at 0° F. in a desiccator containing calcium chloride. The packages were then dropped onto a hard surface from a height of 6 feet. If the package remained intact, it passed the test.

Tests were made for stability at high humidity by storing the packages at 73° F. at 100% relative humidity for 48 hours. Changes in the surface and strength characteristics were observed. Packages which remained sufficiently strong to withstand subsequent handling and which did not become wet or tacky were considered satisfactory in this test.

Example 1

A 25% aqueous solution of "Elvanol" 51–05 polyvinyl alcohol was prepared by mixing 100 parts of the polyvinyl alcohol powder with 300 parts water at 25° C. with agitation, followed by heating the stirred mixture at 90° C. until solution occurred. The solution may also be made without heating, but a longer time is required. To the cooled solution were added 20 parts of glycerol as plasticizer. Films were prepared from the solution and fabricated into packages as previously described.

"Elvanol" 51–05 is a commercial grade of partially hydrolyzed polyvinyl alcohol which is marketed by E. I. du Pont de Nemours and Co. It is prepared by the replacement of 86–90% of the acetate groups of polyvinyl acetate by hydroxyl groups and has a 4% aqueous solution viscosity of 4–6 centipoises at 20° C.

Examples 2–8

Example 1 was repeated using the quantities of plasticizer indicated in Table I for 100 parts of "Elvanol" 51–05 polyvinyl alcohol.

TABLE I

| Example | Glycerol | P-250 [1] | V-C 1-318-19 [2] |
|---|---|---|---|
| 2 | 25 | | |
| 3 | 30 | | |
| 4 | | 20 | 10 |
| 5 | | 15 | 15 |
| 6 | | 23.5 | 11.5 |
| 7 | | 17.5 | 17.5 |
| 8 | | 11.5 | 23.5 |

[1] Polypropylene glycol P-250, marketed by Dow Chemical Company.
[2] V-C 1-318-19 mixed phosphate ester, marketed by Virginia-Carolina Chemical Corporation.

The results obtained in the evaluation of films from Examples 1–8 are summarized in Table II.

TABLE II

| Example | Plasticizer | Percent on Polyvinyl Alcohol | 0° F. Stability Test | 73° F., 100% R.H. Stability Test |
|---|---|---|---|---|
| 1 | Glycerol | 20 | Failed | Seals failed; Tacky. |
| 2 | Glycerol | 25 | Passed | Seals failed; Moist; Weak. |
| 3 | Glycerol | 30 | Failed | Seals failed; Moist; Weak. |
| 4 | 67% P-250 / 33% V-C 1-318-19 | 30 | Passed | Passed. |
| 5 | 50% P-250 / 50% V-C 1-318-19 | 30 | Passed | Passed. |
| 6 | 67% P-250 / 33% V-C 1-318-19 | 35 | Passed | Passed. |
| 7 | 50% P-250 / 50% V-C 1-318-19 | 35 | Passed | Passed. |
| 8 | 33% P-250 / 67% V-C 1-318-19 | 35 | Passed | Passed. |

These results show the superiority of the combination polypropylene glycol-mixed phosphate ester plasticizer over glycerol. The failures with glycerol as plasticizer in the high humidity test were typical of those obtained with other humectant-type plasticizers which were evaluated, such as dipropylene glycol, triethylene glycol, tetraethylene glycol, polyglycerol, ethanol formamide or triethanolamine acetate or lactate.

The film from Example 2 which contained 25% glycerol and passed the low temperature test, was found to contain about 5% water after conditioning at 73° F., 50% relative humidity. When the film was dried over sulfuric acid in a desiccator to a water content of 0.8%, it shattered in the low temperature test. The film from Example 4 containing the combination polypropylene glycol-mixed phosphate ester plasticizer contained only about half as much water as the glycerol-plasticized film after conditioning at 73° F., 50% relative humidity. In the low temperature test after drying over sulfuric acid, the film cracked only slightly thus showing a marked superiority over the glycerol-plasticized film. These results indicate that the combination plasticizer has more of the character of a primary plasticizer for polyvinyl alcohol than does glycerol which, like other humectant-type plasticizers, apparently functions to an appreciable extent by absorbing water which then acts as the primary plasticizer.

None of the plasticizers, including polypropylene glycol P-250 and mixed phosphate ester, V-C 1-318-19, when tested singly at various plasticizer levels, gave films which passed both the low temperature test and the high humidity test. The combination of mixed phosphate ester and polypropylene glycol was the only plasticizer combination which passed both tests.

It was found that a definite relationship between the percentage composition of the combination polypropylene glycol-mixed phosphate ester plasticizer and the percentage of plasticizer composition based on the polyvinyl alcohol must exist for satisfactory performance of the combination plasticizer in both the low temperature and high humidity tests. Thus, for those applications of the polyvinyl alcohol compositions, such as water-soluble packages, where stability at the extremes of temperature and humidity encountered under various atmospheric conditions is required, the percentage by weight of plasticizer composition, Y, based on the polyvinyl alcohol must be between the values satisfying Equations A and B, (A) $$Y = \frac{X}{5} + 19$$

(B) $$Y = \frac{X}{5} + 29$$

where X is the percent by weight of the mixed phosphate ester in the plasticizer composition and has a value from about 30 to 70. Thus, the amount of mixed phosphate ester in the plasticizer composition may vary from about 30 to 70%. At the lower limit, the total plasticizer composition based on the polyvinyl alcohol lies within the range of about 25 to 35%, and at the higher limit, within the range of 33 to 43%. It is generally preferred that the plasticizer concentration be at about the center of the permissible range, that is, that the relationship between composition and concentration of the plasticizer be close to that expressed by the equation:

$$Y = \frac{X}{5} + 24$$

where X and Y have the meanings hereinbefore defined. A particularly preferred composition based on both performance and cost contains 30% plasticizer based on the polyvinyl alcohol and a 2:1 ratio of polypropylene glycol to mixed phosphate ester. This composition is formulated near the lower range of the total plasticizer concentration required and contains a large proportion of the less expensive plasticizer component, polypropylene glycol. Both of these features lower the cost of the composition, while the optimum performance in both the low temperature and high humidity tests is maintained.

In addition to the advantages of the polypropylene glycol-mixed phosphate ester plasticizer combination over glycerol and other plasticizers alone or in combination under low temperature and high humidity conditions, the combination plasticizer has other advantages. These include more rapid rate of dissolution of the plasticized polyvinyl alcohol film in water and better heat stability. The improved heat stability is evidenced by changes in color, brittleness, and solubility characteristics. These properties are indicated by tests summarized in Table III.

TABLE III

| | Example 2 Film | Example 4 Film |
|---|---|---|
| Plasticizer | Glycerol | P-250. V-C 1-318-19. |
| Film conditioned at 73° F., 50% Relative Humidity: | | |
| Rate of dissolution in water: | | |
| Disintegrate (seconds) | 23.6 | 15.3. |
| Dissolve (seconds) | 33.0 | 21.5. |
| Film heated 0.5 hour at 150° C.: | | |
| Color | Brown | Trace of yellow. |
| Condition | Brittle | Slightly brittle. |
| Rate of dissolution in water: | | |
| Disintegrate (seconds) | Insoluble [1] | 58. |
| Dissolve (seconds) | | 82. |

[1] Did not disintegrate in 3 minutes.

The rate of dissolution in water was determined by dropping films, 2" x 2" and 2 mils thick, into 800 ml. of water at 22° C. in a 1-liter beaker with agitation supplied by a ½" x 1½" paddle stirrer rotating at 200 r.p.m. The times required for the film first to disintegrate and then dissolve completely were recorded.

The aqueous film casting compositions of my invention may be of any concentration which permits the polyvinyl alcohol to be in solution. A homogeneous, fluid solution is desired in order that uniform films may be cast. The concentration of the polyvinyl alcohol solution which can be conveniently handled depends on the particular viscosity grade being used and normally varies from about 10 to 40%. Lower concentrations can be used but require longer drying times.

The aqueous compositions can be prepared by adding the plasticizer to the polyvinyl alcohol solution as in the examples. The method of preparing the compositions is not critical and equivalent results are obtained by other methods, for example dispersing the polyvinyl alcohol powder in water containing the plasticizers and then effecting the dissolution of the powder at room temperature or at temperatures up to 100° C.

Other ingredients, such as band release agents and wetting agents, may be added to the aqueous composition at any stage of its preparation. Band release agents, for example "Armac" TD, the acetic acid salt of a long chain alkyl amine marketed by Armour & Company, may be added in amounts of about 0.2% based on the polyvinyl alcohol to aid in the separation of the dried film from the casting plate. Wetting agents, for example "Triton" X-100, an alkyl aryl polyether alcohol marketed by Rohm & Haas Company, may also be added in small amounts, for example 0.05% based on the polyvinyl alcohol, if required to improve the wetting of the casting plate surface by the casting solution. These materials, if added to aid in casting or removing the films, are used in such small quantities that they do not noticeably affect the properties of the films obtained from the compositions.

The plasticized polyvinyl alcohol compositions of my invention are particularly useful in water-soluble packaging of materials such as detergents, bleaching agents, dyes and insecticides. Packages prepared with my film compositions exhibit the required stability at both high humidity and low temperature and dissolve readily in water. The improved stability of my compositions to discoloration by heating is important in the use of plasticized polyvinyl alcohol in polarized film, and clear and pigmented coatings for paper and textiles.

I claim:

1. A composition comprising a grade of polyvinyl alcohol prepared by replacement of 85 to 95% of the acetate groups of polyvinyl acetate by hydroxyl groups and a plasticizer composition for said polyvinyl alcohol consisting of a mixed phosphate ester represented by the formula, $(C_4H_9O)_aPO[O(CH_2CH_2O)_bH]_{3-a}$, where $a$ is an integer from 1 to 2 and $b$ is an integer from 1 to 4, and a polypropylene glycol containing at least 90% by weight of tetrapropylene glycol.

2. A composition comprising a grade of polyvinyl alcohol prepared by replacement of 85 to 95% of the acetate groups of polyvinyl acetate by hydroxyl groups and a plasticizer composition for said polyvinyl alcohol consisting of a mixed phosphate ester represented by the formula, $(C_4H_9O)_aPO[O(CH_2CH_2O)_bH]_{3-a}$, where $a$ is an integer from 1 to 2 and $b$ is an integer from 1 to 4, and a polypropylene glycol containing at least 90% by weight of tetrapropylene glycol, the amount of said plasticizer composition being such that the value of Y is between the values satisfying the equations $$Y=\frac{X}{5}+19 \text{ and } Y=\frac{X}{5}+29$$

in which Y is the percent by weight of said plasticizer composition based on said polyvinyl alcohol, and X is the percent by weight of the mixed phosphate ester in said plasticizer composition and has a value from about 30 to 70.

3. A composition comprising 100 parts by weight of a grade of polyvinyl alcohol prepared by replacement of 85 to 95% of the acetate groups of polyvinyl acetate by hydroxyl groups, 10 parts by weight of a mixed phosphate ester represented by the formula $$(C_4H_9O)_aPO[O(CH_2CH_2O)_bH]_{3-a}$$

where $a$ is an integer from 1 to 2 and $b$ is an integer from 1 to 4, and 20 parts by weight of a polypropylene glycol containing at least 90% by weight of tetrapropylene glycol.

4. An aqueous film casting composition comprising an aqueous solution of a grade of polyvinyl alcohol made by replacement of 85 to 95% of the acetate groups of polyvinyl acetate by hydroxyl groups and dissolved therein, a plasticizer composition for said polyvinyl alcohol consisting of a mixed phosphate ester represented by the formula $(C_4H_9O)_aPO[O(CH_2CH_2O)_bH]_{3-a}$, where $a$ is an integer from 1 to 2 and $b$ is an integer from 1 to 4, and a polypropylene glycol containing at least 90% by weight of tetrapropylene glycol.

5. An aqueous film casting composition comprising an aqueous solution of a grade of polyvinyl alcohol made by replacement of 85 to 95% of the acetate groups of polyvinyl acetate by hydroxyl groups and dissolved therein, a plasticizer composition for said polyvinyl alcohol consisting of a mixed phosphate ester represented by the formula $(C_4H_9O)_aPO[O(CH_2CH_2O)_bH]_{3-a}$, where $a$ is an integer from 1 to 2 and $b$ is an integer from 1 to 4, and a polypropylene glycol containing at least 90% by weight of tetrapropylene glycol, the amount of said plasticizer composition being such that the value of Y is between the values satisfying the equations $$Y=\frac{X}{5}+19 \text{ and } Y=\frac{X}{5}+29$$

in which Y is the percent by weight of said plasticizer composition based on said polyvinyl alcohol, and X is the percent by weight of the mixed phosphate ester in said plasticizer composition and has a value from about 30 to 70.

6. An aqueous film casting composition comprising an aqueous solution of 100 parts by weight of a grade of polyvinyl alcohol prepared by replacement of 85 to 95% of the acetate groups of polyvinyl acetate by hydroxyl groups, and dissolved therein, 10 parts by weight of a mixed phosphate ester represented by the formula $(C_4H_9O)_aPO[O(CH_2CH_2O)_bH]_{3-a}$, where $a$ is an integer from 1 to 2 and $b$ is an integer from 1 to 4, and 20 parts by weight of a polypropylene glycol containing at least 90% by weight of tetrapropylene glycol.

References Cited in the file of this patent

UNITED STATES PATENTS 2,842,462    Haas et al. _____ July 8, 1958

OTHER REFERENCES

"Plasticizers," D. N. Buttrey (2nd edition), 1957, page 44.

"Vinylite Resins," Bakelite Corporation, page 4, copyright 1944, Library Call No. TP986–V4B15.